US006481284B2

(12) United States Patent
Geen et al.

(10) Patent No.: US 6,481,284 B2
(45) Date of Patent: Nov. 19, 2002

(54) MICROMACHINED DEVICES WITH ANTI-LEVITATION DEVICES

(75) Inventors: John A. Geen, Tewksbury, MA (US); Donald W. Carow, East Walpole, MA (US)

(73) Assignee: Analog Devices, Inc., Norwood, MA (US)

(*) Notice: Subject to any disclaimer, the term of this patent is extended or adjusted under 35 U.S.C. 154(b) by 0 days.

(21) Appl. No.: 10/022,688

(22) Filed: Dec. 17, 2001

(65) Prior Publication Data

US 2002/0046603 A1 Apr. 25, 2002

Related U.S. Application Data

(62) Division of application No. 09/645,199, filed on Aug. 25, 2000, which is a division of application No. 08/921,672, filed on Sep. 2, 1997, now Pat. No. 6,122,961.

(51) Int. Cl.[7] .................................................. G01P 9/04
(52) U.S. Cl. .................................. 73/504.12; 73/504.14
(58) Field of Search .......................... 73/504.12, 504.13, 73/504.14, 504.15, 504.16, 504.04

(56) References Cited

U.S. PATENT DOCUMENTS

| | | | |
|---|---|---|---|
| 4,782,700 A | 11/1988 | Hulsing | 73/505 |
| 4,811,602 A | 3/1989 | Hulsing | 73/505 |
| 4,821,572 A | 4/1989 | Hulsing, II | 73/505 |
| 4,848,156 A | 7/1989 | Hulsing | 73/505 |
| 4,864,861 A | 9/1989 | Hulsing | 73/517 AV |
| 5,025,346 A | 6/1991 | Tang et al. | 361/283 |
| 5,111,693 A | 5/1992 | Greiff | 73/514 |
| 5,126,812 A | 6/1992 | Greiff | 357/25 |
| 5,168,756 A | 12/1992 | Hulsing, II | 73/505 |
| 5,203,208 A | 4/1993 | Bernstein | 73/505 |
| 5,241,861 A | 9/1993 | Hulsing, II | 73/505 |
| 5,249,465 A | 10/1993 | Bennett et al. | 73/510 |
| 5,275,048 A | 1/1994 | Hulsing, II et al. | 73/514 |

(List continued on next page.)

FOREIGN PATENT DOCUMENTS

| | | |
|---|---|---|
| EP | 0 623 807 A1 | 5/1994 |
| JP | 06 123631 | 5/1994 |
| WO | 92/14160 | 8/1992 |
| WO | 93/14409 | 7/1993 |
| WO | 94/14076 | 6/1994 |
| WO | 96/39614 | 12/1996 |

OTHER PUBLICATIONS

Tang et al:; Electrostatic Comb Drive Levitation and Control Method; (Dec. 1992); Journal of Microelectromechanical Systems; 1(4); pp. 170–178.

Geen, J.A.; "Inertial Sensor Micromachining at Northrup"; (1993); A Presentation to the Inst. of Navigation, 49th Annual Meeting.

Hunt et al.; "Development of an Accurate Tuning–Fork Gyroscope"; (1964–65); Proc. Instr. Mach. Engrs, vol. 179 Pt. 3E: pp. 129–139.

Hulsing, II et al.; "Miniature IMU Based on Micro–Machined Coriolis Sensors"; pp. 353–360 (Undated).

Ljung; University of California Berkley; "Surface Micromachined Gyro Structure"; (1993).

*Primary Examiner*—John E. Chapman
(74) *Attorney, Agent, or Firm*—Hale and Dorr LLP

(57) ABSTRACT

A micromachined device has first and second sets of interdigitating fingers movable on a plane parallel to a substrate. A first group of conductive members is formed on the substrate and is at the same DC voltage as a first group of fingers. A second group of conductive members is formed on the substrate and is electrically coupled to the second group of fingers. The conductive members help to prevent one group of fingers from levitating with respect to others.

20 Claims, 11 Drawing Sheets

U.S. PATENT DOCUMENTS

| | | |
|---|---|---|
| 5,313,835 A | 5/1994 | Dunn ........................... 73/505 |
| 5,331,853 A | 7/1994 | Hulsing, II ................... 73/505 |
| 5,341,682 A | 8/1994 | Hulsing, II ................... 73/505 |
| 5,349,855 A | 9/1994 | Bernstein et al. ............. 73/505 |
| 5,367,217 A | 11/1994 | Norling ...................... 310/370 |
| 5,377,544 A | 1/1995 | Dunn ........................... 73/505 |
| 5,392,650 A | 2/1995 | O'Brien et al. ........... 73/517 A |
| 5,396,797 A | 3/1995 | Hulsing, II ................... 73/505 |
| 5,536,988 A | 7/1996 | Zhang et al. ................ 310/309 |
| 5,635,638 A | 6/1997 | Geen ........................ 73/504.04 |
| 5,635,640 A | 6/1997 | Geen ........................ 73/504.12 |
| 5,734,105 A | 3/1998 | Mizukoshi ............... 73/504.02 |
| 5,892,153 A * | 4/1999 | Weinberg et al. ........ 73/504.12 |
| 5,992,233 A * | 11/1999 | Clark ...................... 73/504.12 |

* cited by examiner

MICROMACHINED DEVICES WITH ANTI-LEVITATION DEVICES

CROSS REFERENCED TO RELATED APPLICATION

This application is a divisional of application Ser. No. 09/645,199, filed Aug. 25, 2000, pending, which is a divisional of application Ser. No. 08/921,672, filed Sep. 2, 1997, now U.S. Pat. No. 6,122,961; each of which is incorporated herein by reference.

BACKGROUND OF THE INVENTION

This invention relates to micromachined gyros.

A surface micromachined gyro has a planar body (or a number of bodies) suspended with anchors and flexures over and parallel to an underlying substrate. The body is dithered along a dither axis in a plane parallel to the substrate and perpendicular to a sensitive axis that can be in the plane of the body or perpendicular to the body and to the substrate. As is generally known, rotation by the body about the sensitive axis causes the body move along a Coriolis axis, which is mutually orthogonal to the dither axis and the sensitive axis. This motion can be sensed to derive a signal that indicates the angular velocity of the rotation.

Because of mechanical imperfections in the body and in the flexures, a suspended mass will typically not be perfectly parallel to the substrate, and the dither and sensitive will typically not be perfectly orthogonal. Consequently, when the body is dithered, an interference signal, referred to as the quadrature signal, is induced by the dithering motion itself. This quadrature signal, which is unrelated to the rotation to be sensed, interferes with the desired signal relating to the rotation. The quadrature signal (a) is proportional to the acceleration in the dither direction with a constant of proportionality indicative of the mechanical misalignment; (b) has the same frequency as the dither frequency; and (c) is 90° out of phase with the dither velocity, unlike the Coriolis signal which is in phase with the velocity. Because of this 90° phase difference, the quadrature signal can be partially rejected with a phase-sensitive detector. The effectiveness of such rejection, however, depends on how precise the phase relationships are maintained in the electronics.

SUMMARY OF THE INVENTION

In one aspect, the present invention is a micromachined gyro in which there is minimal interference in the output signal caused by the dither signal. The gyro has a first body, suspended over a substrate and dithered along a dither axis, and a second body coupled to the first body and also suspended over the substrate. The first and second bodies are coupled together and anchored to the substrate such that the first body can move along the dither axis but is substantially inhibited from moving along a Coriolis axis (perpendicular to the dither axis) relative to the second body, and the second body is movable with the first body along the Coriolis axis but is substantially inhibited from moving along the dither axis. The coupling between the first body and the second body substantially decouples the dithering movement from the movement along the Coriolis axis in response to rotation about the sensitive axis, thus minimizing the unwanted quadrature signal. One of the first and second bodies preferably surrounds the other; the dithered first body is preferably on the inside and surrounded by the second body, although the first body can surround the second body.

In another aspect, a micromachined device has a first body with fingers interdigitating with fixed drive fingers that cause the first body to dither along a dither axis. At least one conductive member is formed under some, but not all, of the fixed dither drive fingers and is electrically coupled to the drive fingers to keep the first body in the desired vertical plane and to prevent the first body from levitating due to fringe effects.

In yet another aspect, a micromachined device has a movable body suspended over a substrate and at least one stop member positioned near the movable body. The stop member includes a hook portion extending over the movable body such that the stop member limits both lateral movement and vertical movement by the body.

In still another aspect, a micromachined device has a suspended movable body with an outer perimeter portion and at least one cross-piece that defines a number of apertures enclosed by the perimeter portion. The body has fingers extending into the apertures. These fingers can be used either to dither the body or to sense motion of the body.

In another aspect, the micromachined device has an inner body surrounded by an outer body, the outer and inner bodies being inhibited from movement together along one axis by flexures oriented along that one axis. These flexures are connected between the body and an elongated stationary member anchored at a midpoint and with the flexures extending from each end to the body. The elongated member is preferably between the inner and outer bodies In still another aspect of the invention, a first micromachined structure is positioned near a second micromachined structure, and the first micromachined structure is dithered relative to the second micromachined structure. These first and second structures are connected together with coupling structures designed to minimize stress and to encourage opposite ends of the structure to move together in the direction of dithering toward and away from the second structure. While there are a number of variations of coupling structures that can be used, these include structures that have elongated members extending from ends of the first structure and extending toward the center of the structure along a direction perpendicular to the dithering direction. These elongated members are connected by a short connecting beam that encourages the elongated members to move together in the same direction at the same time, rather than moving in opposite directions. These elongated members are connected to the first structure with perpendicular members that define a pivot point.

Openings can be cut out of the second structure to reduce the combined mass of the first and second structures, while still maintaining stiffness in the structure. In addition to the coupling structures between the first and second structures, the second structure is also anchored to the substrate through plates that are relatively wide compared to the width of the second structure itself. These plates are connected together by perpendicular members that define a pivot point.

The gyro of the present invention minimizes the quadrature signal, and thus is very accurate compared to prior gyro designs. The accuracy due to the structure of the gyro obviates the need for complex electronics, and also allows the device to be packaged under ambient conditions. The stop members, the conductive members on the substrate, use of multiple apertures with inwardly extending fingers, and use of a centrally anchored stationary member for supporting flexures along an axis of inhibited movement all improve performance and reliability of a micromachined device in general and a gyro in particular. Other features and advantages will become apparent from the following detailed description, the drawings, and the claims.

BRIEF DESCRIPTION THE DRAWINGS

DETAILED DESCRIPTION

Figure 1:
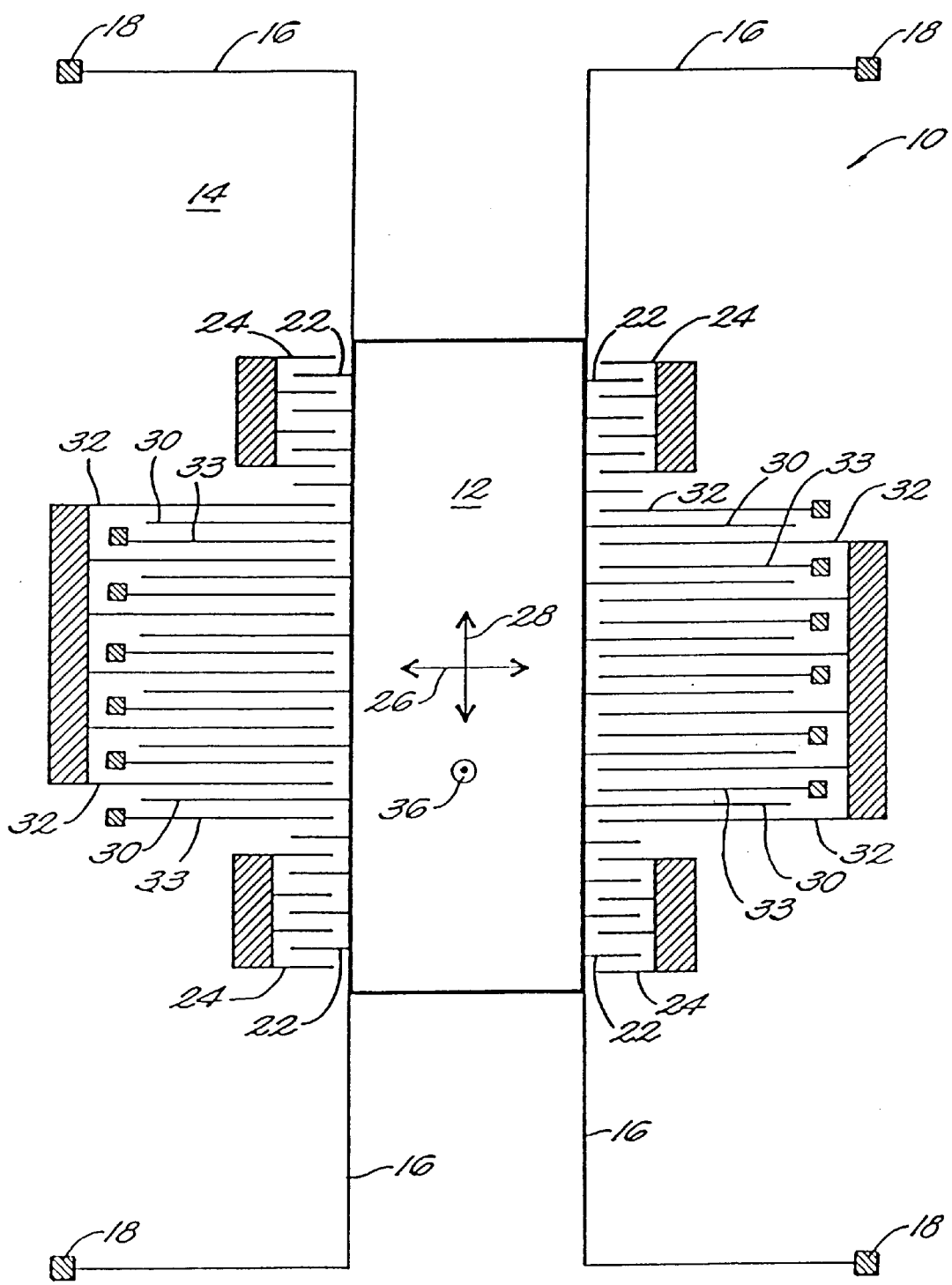
FIG. 1 is a plan view of a micromachined gyro that is similar in principle to known gyros.

FIG. 1 illustrates a simplified surface micromachined gyro 10 that is structurally and operationally similar to known gyros. Gyro 10 has an essentially planar body 12 suspended over and parallel to an underlying substrate 14. Body 12 is supported with four flexures 16, each of which extends from a respective support anchor 18 to a different corner of body 12. Fingers 22 extend from body 12 and interdigitate with fixed drive fingers 24 that are coupled to an AC voltage source (not shown) to dither the body at its resonant frequency along a dither axis 26. When body 12 rotates about a sensitive axis 36, body 12 moves along a Coriolis axis 28 that is mutually orthogonal to sensitive axis 36 and dither axis 26. This movement is sensed with a differential capacitor that includes fingers 30 that extend away from body 12 along axes parallel to dither axis 26, and two sets of inwardly extending fixed sensing fingers 32 and 33. The differential capacitor is formed from many individual cells, each cell having two fixed fingers 32, 33 and one finger 30 serving as a movable finger and interdigitation with fixed fingers 32, 33.

As is generally known, if the dither motion is x=xsin(wt), the dither velocity is x'=wxcos(wt), where w is the angular frequency and is directly proportional to the resonant frequency of the body by a factor of 2Π. In response to an angular rate of motion R about sensitive axis 36, a Coriolis acceleration y"=2Rx' is induced along Coriolis axis 28. The signal of the acceleration thus has the same angular frequency w as dithering velocity x'. By sensing acceleration along Coriolis axis 28, rotational velocity R can thus be determined.

Due to mechanical imperfections, e.g., if one flexure is more compliant than the others due to overetching, the center of suspension of the body may not coincide with its center of mass and thus the mass can wobble during the dithering motion. Such wobbling causes a component of the dither motion to appear along the sensitive axis. This component creates the interfering quadrature signal. This signal can be very large compared with the desired rotational signal being measured; e.g., it can be as much as 10% of the dither motion, creating a signal 10,000 times greater than the Coriolis signal. The need to eliminate this quadrature signal places a great burden on the signal processing electronics.

Figure 2:
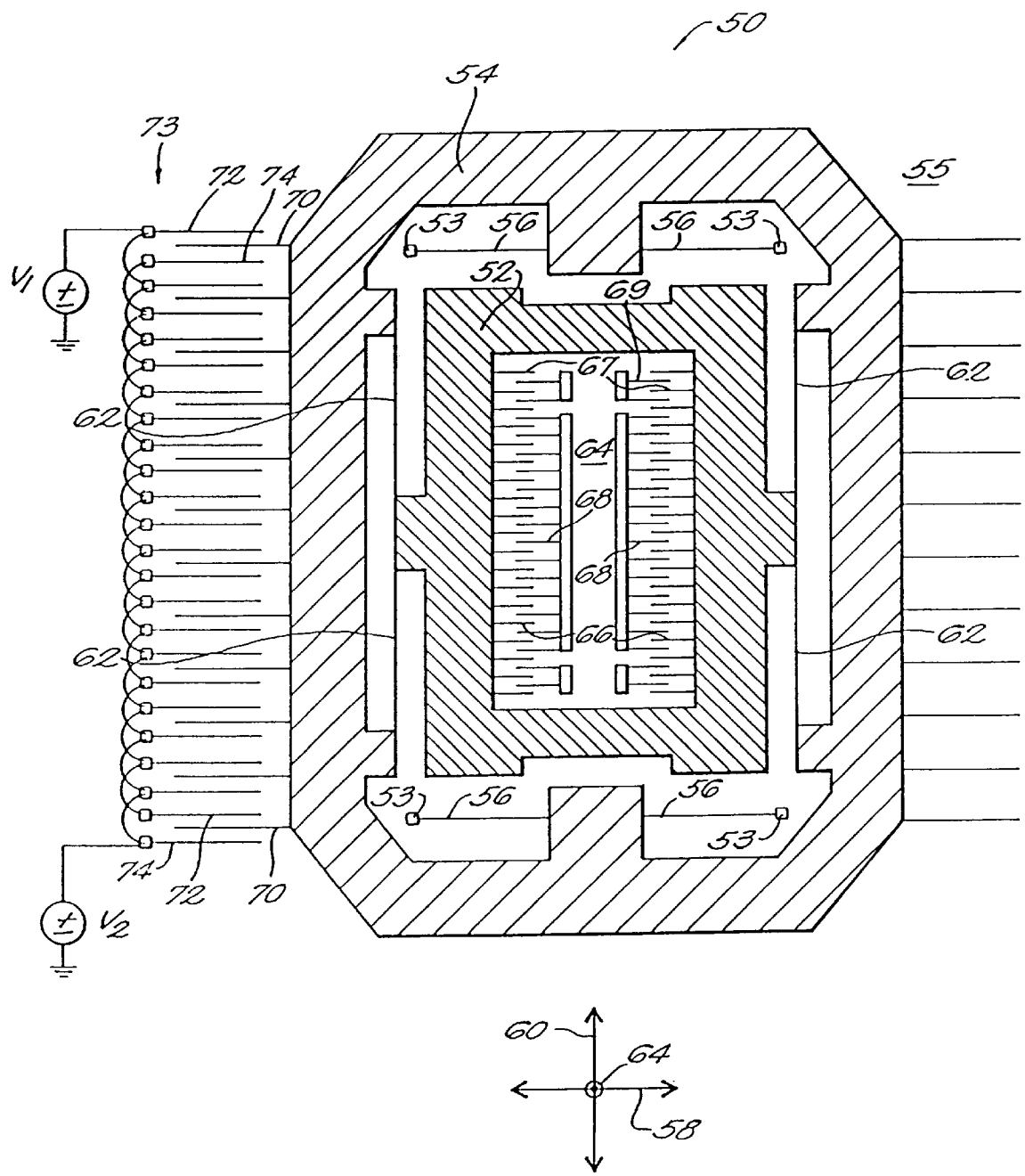
FIG. 2 is a plan view of a micromachined gyro according to a first embodiment of the present invention.

FIG. 2 is a plan view of a surface micromachined gyro 50 illustrating a simplified first embodiment of the present invention. Gyro 50 has a suspended body with an inner frame 52 and an outer frame 54 surrounding inner frame 52. Frames 52, 54 are coplanar and are suspended over and parallel to an underlying substrate 55. Outer frame 54 is suspended with flexures 56 that extend along axes parallel to a dither axis 58 and are anchored to substrate 55 with anchors 53. This orientation of flexures 56 allows outer frame 54 to move along a Coriolis axis 60, but substantially prevents outer frame 54 from moving along dither axis 58.

Inner frame 52 is coupled to and suspended from outer frame 54 with flexures 62 that extend along axes parallel to Coriolis axis 60. The orientation of flexures 62 allows inner frame 52 to move along dither axis 58 relative to outer frame 54, substantially inhibits relative motion of the frames along Coriolis axis 60, but allows inner frame 52 and outer frame 54 to move together along Coriolis axis 60. Accordingly, for both inner frame 52 and the outer frame 54, control over allowable and inhibited directions of movement is achieved by orienting the axes of the flexures along the inhibited axis.

To summarize these allowed and inhibited movements, inner frame 52:

(a) can move relative to outer frame 54 along the dither axis independent of the movement of outer frame 54; and (b) cannot move along the Coriolis axis relative to outer frame 54, but can move along the Coriolis axis with outer frame 54;

while outer frame 54:

(a) cannot move along the dither axis; and (b) can move along the Coriolis axis but only by moving inner frame 52 along with it.

Figure 9:
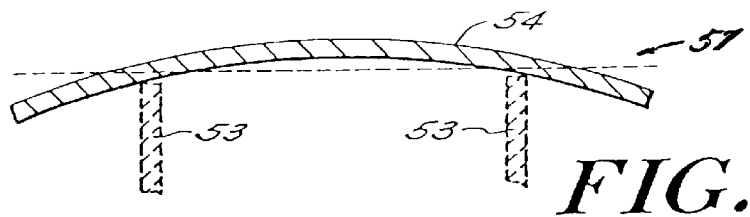
FIG. 9 is a cross-section view of a frame illustrating a desired placement of the anchors.

Anchors 53 for flexures 56 are preferably located within the space between inner frame 52 and outer frame 54. Referring to FIG. 9, this structure is useful because a suspended structure, such as outer frame 54, can tend to have a bowed shape with a high point in the center and low points at the ends. It is desirable for the anchors to be located at the vertical position of the center of gravity 57 so that the extremes of bowing do not unmesh the fingers and so that any wobbling induced by the center of gravity being vertically displaced from the center of suspension is minimized.

Referring again to FIG. 2, inner frame 52 is shaped generally as a rectangular annulus with a central rectangular aperture 64. Drive fingers 66 and sensing fingers 67 extend inwardly from inner frame 52 into aperture 64 along parallel axes that are parallel to dither axis 58. Positioning drive fingers 66 in the aperture as shown helps to maximize the outer perimeter and area of inner frame 52, thus allowing for a larger numbers of drive fingers, thereby improving the response to the dither signal. Drive fingers 66 interdigitate with fixed dither drive fingers 68, while sensing fingers 67 interdigitate with fixed sensing fingers 69. Fixed fingers 68 and 69 are anchors to and fixed relative to underlying substrate 55, while fingers 66 and 67 move with inner frame 52 and thus are movable relative to substrate 55.

A drive signal is provided from a dither drive mechanism (not shown) that includes an AC voltage source coupled to fixed dither drive fingers 68 to cause inner frame 52 to be dithered relative to outer frame 54 along dither axis 58 at a velocity such as x'=w×cos(wt) as noted above; more preferably, the dither is caused by a square wave. The dithering motion is sensed by the change in capacitance between movable sensing fingers 67 and fixed sensing fingers 69. This sensed motion is amplified and fed back to the dither drive mechanism to sustain the dithering motion at the resonant frequency of the inner frame.

When there is no rotational velocity R about sensitive axis 64, outer frame 54 does not move relative to substrate 55. When there is a rotational velocity R, inner frame 52 will tend to move along Coriolis axis 60 with an acceleration y"=2Rx', which is 2(R/w)x"(cos (wt)/sin(wt)), because x"=w²×sin(wt). Flexures 56 allow the inner frame 52 to move with outer frame 54 along the Coriolis axis. Note that the ratio of y" to x" is 2R/w, which is actually modified by m/M, where m is the mass of the inner frame, and M is the total mass of both frames. Assuming m/M=½, R=1 rad/sec, and w=2Π×10⁴ rad/sec, the ratio of the magnitudes of y" to x" is about 16 ppm.

To sense the movement along Coriolis axis 60, outer frame 54 has fingers 70 that extend along axes parallel to the dither axis and interdigitate with fixed fingers 72, 74 on either side of fingers 70 (fingers 72, 74 are only shown on one side). Fingers 72, 74 are fixed with anchors 73 to substrate 55. Fingers 72 are electrically connected together to a first fixed DC voltage source with a voltage $V_1$, and fingers 74 are connected together to a second fixed DC voltage source with a voltage $V_2$. As fingers 70 of outer frame 54 move toward one or the other of fingers 72 or 74, the voltage on outer frame 54 changes. By sensing the voltage on outer frame 54, the size and direction of movement can therefore be determined.

If desired, a carrier signal with a frequency much larger than the dither frequency can be applied to fixed fingers 72, 74, and the resulting output is then amplified and demodulated. Such sensing techniques are known in the field of linear accelerometers. A carrier signal is not necessary with the structure of the present invention, however, because this structure substantially eliminates the interfering quadrature signal, and thus the added complexity in the circuitry is undesirable if avoidable.

Figure 3:
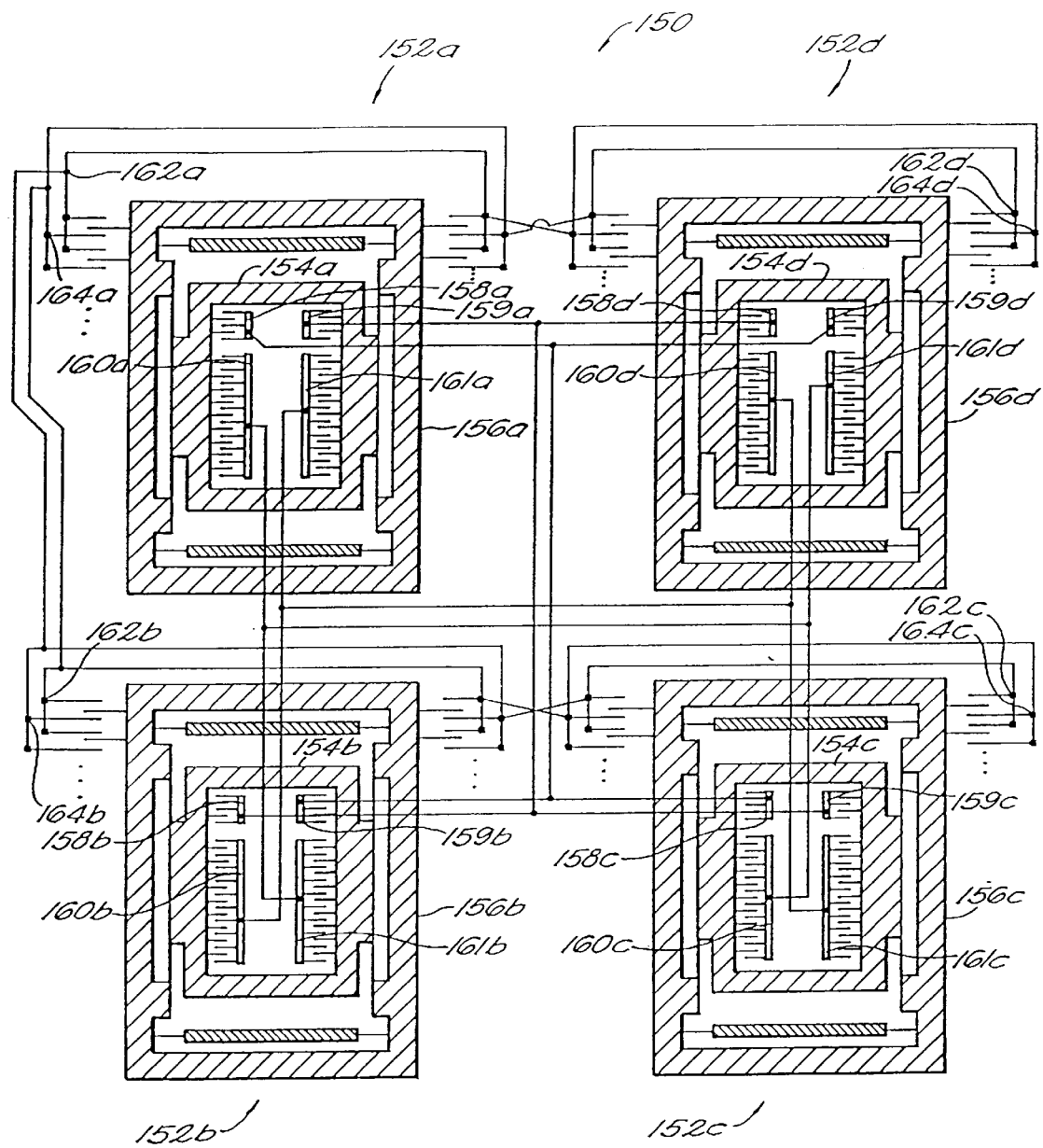
FIG. 3 is a plan view of a gyro according to a second embodiment of the present invention.

Referring to FIG. 3, in another embodiment of the present invention, one large gyro 150 includes four substantially identical gyros 152a–152d arranged in a rectangular configuration and shown here in a simplified form. Gyros 152a–152d have respective inner frames 154a–154d, outer frames 156a–156d, dither drive structures 158a–158d and 159a–159d on opposite sides of the inner frames, dither sensing structures 160a–160d and 161a–161d, and fixed fingers 162a–162d and 164a–164d for sensing motion along the Coriolis axes. These gyros are connected in a "cross-quad" manner as shown. With this interconnection, fixed fingers 162a and 162c are electrically connected together and to fixed fingers 164b and 164d; fixed fingers 162b and 162d are electrically coupled together and to fixed fingers 164a and 164c; dither drive structures 158a, 158c, 159b, and 159d are electrically connected together; dither drive structures 158b, 158d, 159a, and 159c are electrically connected together; dither sensing structures 160a, 160c, 161b, and 161d are electrically connected together; and dither sensing structures 160b, 160d, 161a, and 161c are electrically connected together.

Such a cross-quad connection eliminates errors due to manufacturing and temperature gradients and also eliminates sensitivity to external linear acceleration. Such a connection is also described in Patent Publication No. WO 96/39615, which is expressly incorporated by reference for all purposes.

Figure 4:
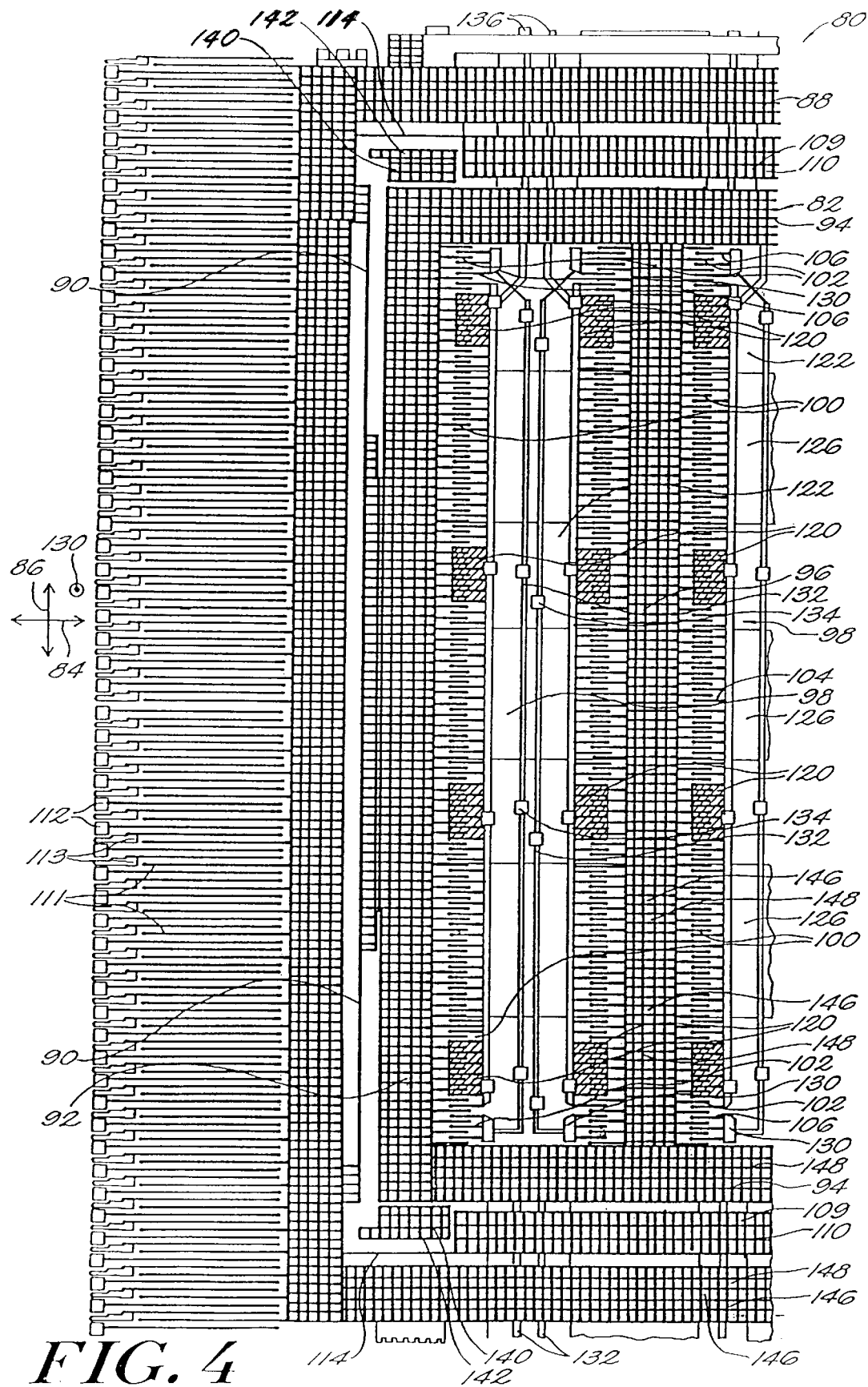
FIG. 4 is a more detailed plan view of a portion of a gyro according to a third embodiment of the present invention.

FIG. 4 is a detailed view of a little more than one-half of one gyro 80; the other half of gyro 80 is substantially the same as the half that is shown. As in the embodiment of FIG. 2, each gyro has an inner frame 82 and an outer frame 88. Flexures 90 extend along axes parallel to a Coriolis axis 86 from inner frame 82 to outer frame 88. With these flexures, inner frame 82 can move along a dither axis 84 relative to an outer frame 88, but is substantially inhibited from moving along Coriolis axis 86 relative to outer frame 88. Outer frame 88 is movable along Coriolis axis 86 along with inner frame 82.

The structures have a number of larger openings 146 in the inner and outer frames resulting from the removal of pedestals made of photoresist and later etched away as part of the manufacturing process. Smaller holes 148 are formed in the structures so that a solvent can be introduced to etch out a sacrificial oxide layer. Such processing techniques for surface micromachined accelerometers are generally known and are described, for example, in U.S. Pat. No. 5,326,726, which is expressly incorporated by reference for all purposes.

Inner frame 82 is roughly shaped as a rectangular ring with two relatively long sides 92 (one of which is shown) and two relatively short sides 94. Extending along the interior aperture surrounded by frame 82 are two elongated cross-pieces 96 (one of which is shown) integrally formed with the outer ring of inner frame 82 and extending parallel to relatively long sides 92 from one relatively short side to the other. Inner frame 82 thus has three elongated apertures 98 (one and a half of which are shown), rather than the one shown in the embodiment of FIG. 2. With these multiple apertures, there can be additional rows (six in this case) of movable dither fingers and fixed dither fingers instead of two, thus increasing response and consistency.

Extending into apertures 98 from both long sides 92 and from elongated cross-pieces 96 are drive fingers 100 and sensing fingers 102 extending in parallel and along axes parallel to dither axis 84. Drive fingers 100 and sensing fingers 102 interdigitate with fixed drive fingers 104 and with fixed dither sensing fingers 106, respectively. Fixed drive fingers 104 are driven with an AC signal to cause drive fingers 100, and hence inner frame 82, to move along dither axis 84. If the AC signal is sinusoidal, the inner frame moves with a displacement x=x sin(wt), and therefore with a velocity of x'=w×cos(wt), with angular frequency $w=2\Pi f_{res}$ (resonant frequency $f_{res}$ can be different for different types of structures, but is typically in the 10–25 KHz range).

Fixed dither sensing fingers 106 interdigitate with fingers 102, and the change in capacitance between these fingers is sensed to monitor the dither motion and to provide a feedback signal to the dither drive to maintain the dither motion at the desired angular frequency w. Fixed sensing fingers 106 are anchored to substrate 98 with anchors 130 and are electrically coupled together with conductive lines 132 formed on substrate 98. Fixed dither drive fingers 104 are anchored to substrate 98 with anchors 134 and are electrically coupled away from the gyro with conductive lines 136.

Along relatively short sides 92 between inner frame 82 and outer frame 88 are two stationary members 110 anchored to and fixed relative to substrate 98. Flexures 114 extend from outer frame 88 to stationary members 110 along axes parallel to dither axis 84, and therefore substantially prevent outer frame 88 from moving along dither axis 84.

Stationary members 110 are anchored to substrate 98 with anchors 109 that are located at the midpoint of stationary members 110. This location minimizes stress because any shrinkage that occurs in stationary members 110 and flexures 114 during manufacturing is similar to that in outer frame 88. Therefore, there is no residual stress in the dither direction in flexures 114.

Stationary members 110 are very useful because they provide for flexures 114 to have the correct length, provide attachment points for flexures 114 that are far from a center line of the device, thereby stabilizing outer frame 86 against tilting, and provide freedom from shrinkage along the lengthwise direction of flexures 114.

Extending outwardly away from outer frame 88 along axes parallel to dither axis 84 is a large number of fingers 111, each of which is disposed between two fixed sensing fingers 112, 113 to form a capacitive cell. The large number of cells together form a differential capacitor. Fixed sensing fingers 112, 113 are anchored at their ends and are electrically connected to other respective fingers 112, 113 and to a different DC voltage as noted in connection with FIG. 2.

This assembly of sensing fingers on a suspended frame essentially forms a sensitive accelerometer of the type disclosed in the incorporated patent publication, with its function being to sense the Coriolis acceleration. The accelerometer is also sensitive to externally applied accelerations, but two of the gyros in the cross-quad arrangement are sensitive in the opposite sense to the other two, thereby canceling such external interference.

In one exemplary embodiment, inner frame 82 and outer frame 88 are each at 12 volts DC, while fixed fingers 112, 113 are all at 0 volts DC. As outer body 88 and its fingers 111 move, a change in voltage is induced on fingers 112, 113. A high frequency carrier signal can be provided to the fixed sensing fingers, but with the accuracy of the gyro according to the present invention, the carrier is not needed, and thus the required circuitry is minimized by avoiding the need for a high frequency demodulator.

If there is rotation about a sensitive axis 130 (which is mutually orthogonal to both dither axis 84 and Coriolis axis 86), outer frame 86 and inner frame 82 move together along Coriolis axis 86 in response to the rotation. If there is no such rotation about sensitive axis 130, the dither motion of inner frame 82 causes substantially no motion by outer frame 88 along Coriolis axis 86.

The decoupling of motion along the dither axis and sensitive axis has significant beneficial effects. Imbalances in the flexures produce very little dither motion along the sensitive axis. In this case, the interfering quadrature signal can be reduced to as low as 0.5 parts per million (ppm) or 0.00005%; this small quadrature signal results from the same types of mechanical imbalances that otherwise could produce a 10% interference signal in a gyro of the type generally shown in FIG. 1. Moreover, the rotationally induced acceleration that the gyro is designed to sense is inhibited very little. Because of this accuracy, the circuitry need not be particularly complex.

Another benefit from this structure arises in the packaging. The increase in the signal from the large number of fingers due to the apertures, and from the four gyros in the cross-quad arrangement, eliminates the need to enhance the signal by reducing air damping, and thus makes ambient packaging possible, rather than more costly vacuum packaging.

Figure 5:
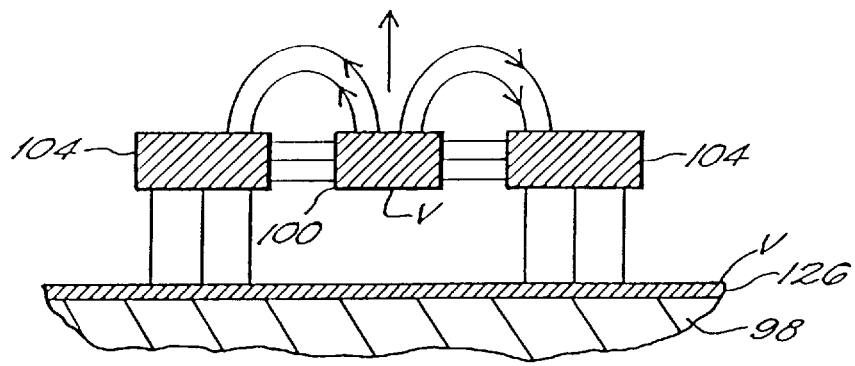
FIGS. 5–7 are cross-sectional views of portions of the gyro of FIG. 4 illustrating certain features in the gyro.
Figure 6:
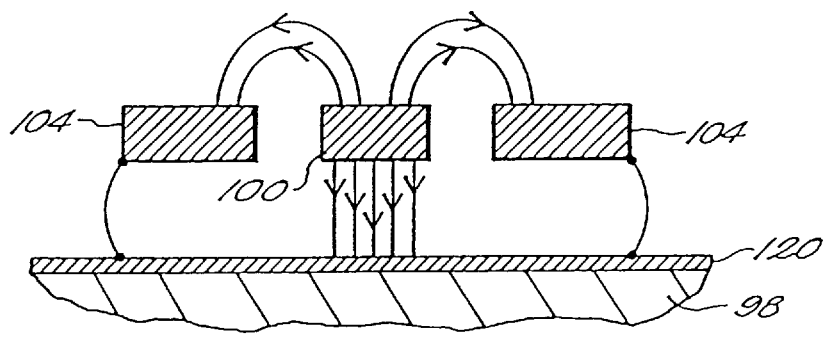

Referring also to FIGS. 5 and 6, another aspect of the present invention is illustrated. Along much of the row of fixed drive fingers 104 are conductive members 126 at voltage V, preferably the same DC voltage as inner frame 82 and outer frame 88 (i.e., 12 volts). Meanwhile, the drive fingers are preferably driven with a square wave with an amplitude of 12 volts. At several other locations along the row of fixed dither drive fingers 104, conductive members 120 are formed on substrate 98 under groups of fingers and are electrically coupled to drive fingers 104. As shown in FIG. 4, conductive members 120 have a length coextensive with the length of fingers 104 and a width that extends across five fingers 104, while conductive members 126 extend across the inner frame with a width that extends along fourteen fingers 104.

Referring to FIG. 5, where movable drive fingers 100 and fixed drive fingers 104 are formed over conductive members 126, there will be a net upward force on movable drive fingers 100 due to fringe effects from adjacent fingers 104, and thus fingers 100 will have a tendency to levitate. Conductive members 126 are used and kept at 12 volts to prevent static collapse and makes the stray capacitance well-defined.

As shown in FIG. 6, however, where conductive members 120 are formed under drive fingers 100 and fixed dither fingers 104, an attraction by movable drive fingers 100 toward substrate 98 causes a net downward force that should counteract the net upward force shown in FIG. 5. The downward force due conductive members 120 is greater per finger 100 than the net upward force shown in FIG. 5 per finger 100 because conductive members 120 are formed under fewer fingers. By positioning anti-levitating conductive members 120 periodically along the length, levitation is prevented.

Figure 7:
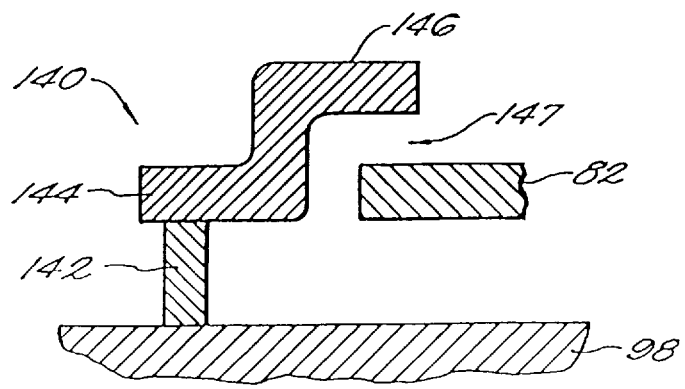

Referring to FIGS. 4 and 7, another aspect of the present invention is illustrated. Gyro 80 in FIG. 4 has four stop members 140 (two of which are shown) positioned relative to substrate 98 and to inner frame 82 to prevent excessive movement in any direction. Stop members 140 have a first portion 144 that is substantially coplanar with inner frame 82, and a hook portion 146 that extends over frame 82. Stop member 140 is connected with an anchor 142 to substrate 98. Frame 82 is substantially inhibited from movement both into the stop member in the plane of frame 82 due to coplanar portion 144, and also is inhibited from moving too far upwardly due to hook portion 146.

As described in incorporated U.S. Pat. No. 5,326,726, to produce suspended inner frame 82, a layer of polysilicon is formed over a sacrificial oxide. When the oxide is removed (etched), a suspended polysilicon structure is left behind. To form stop members 140, a further oxide layer is formed over inner frame 82, and then a material for forming stop members 140 is formed over that further oxide at locations 147. Etching out this further oxide leaves behind stop members 140. The material used for stop members 140 preferably is one that minimizes the risk of inner frame 82 contacting and sticking to stop member 140 (a problem referred to as "stiction"). The preferred material is titanium tungsten (TiW) because this material has low stiction, compatibility with electronics processing, good conductivity, and high mechanical strength. An appropriately coated silicon could also be used.

Figure 8:
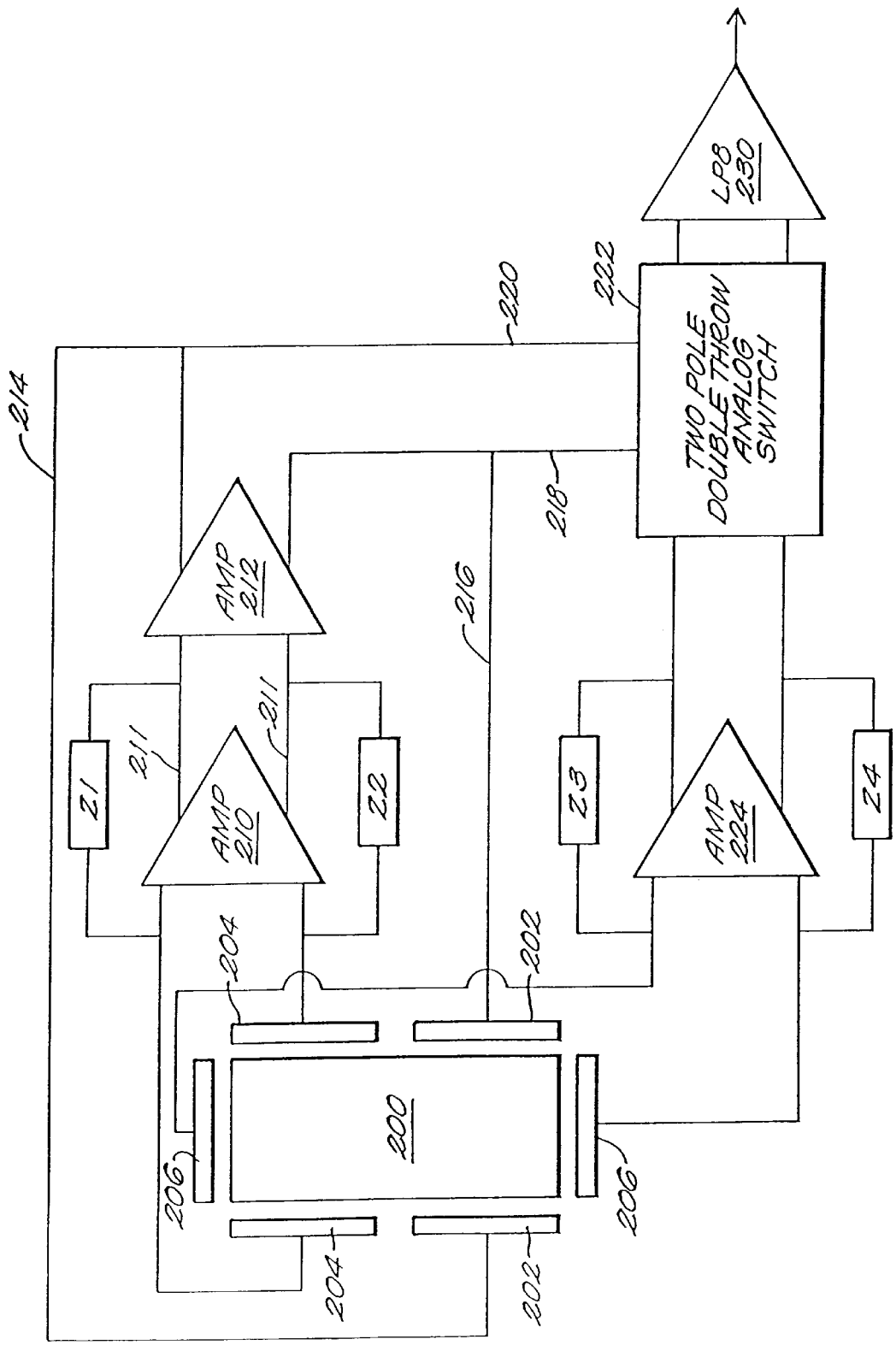
FIG. 8 is a partial pictorial and partial block diagram of a circuit for use with a gyro of the type shown in FIGS. 2 and 4.

Referring to FIG. 8, a circuit is shown for use with gyros such as those shown in FIGS. 2 and 4. In FIG. 8, a gyro body 200 includes both a first body and a second body interconnected to decouple the dither motion from the Coriolis motion. Body 200 is maintained at an elevated voltage relative to sensing plates 204, and is driven with a signal from dither drive plates 202 to create a dither motion that is sensed by dither sensing plates 204. The motion along a Coriolis axis is sensed by Coriolis plates 206. This circuitry would be considered rather simple in that it has a relaxed phase specification, and is made possible by the design of the body that substantially eliminates the quadrature signal.

Capacitive sensing plates 204 are coupled to inputs of an amplifier 210 that provides two outputs 211, each of which is coupled to inputs of amplifier 210 through a feedback impedance network Z1, Z2 that is primarily resistive. The output of amplified 210 is provided to a second amplifier 212 that provides two outputs along two paths. The first paths 214, 216 provide the feedback signal to dither drive plates 202 to help keep the body 200 dithering at the resonant frequency. The other two paths 218, 220 from amplifier 212 are provided to a two pole, double throw analog switch 222 that serves as a synchronous rectifier. Switch 222 also receives two inputs from the output of an amplifier 224 that receives inputs from Coriolis sensing plates 206. Amplifier 224 has feedback networks Z3 and Z4 that are primarily capacitive. The signals from amplifier 212 alternate the polarity of the Coriolis signals from amplifier 224, thereby phase demodulating the Coriolis signals. The output from switch 222 is provided to a buffering low pass filter 230.

Figure 10:
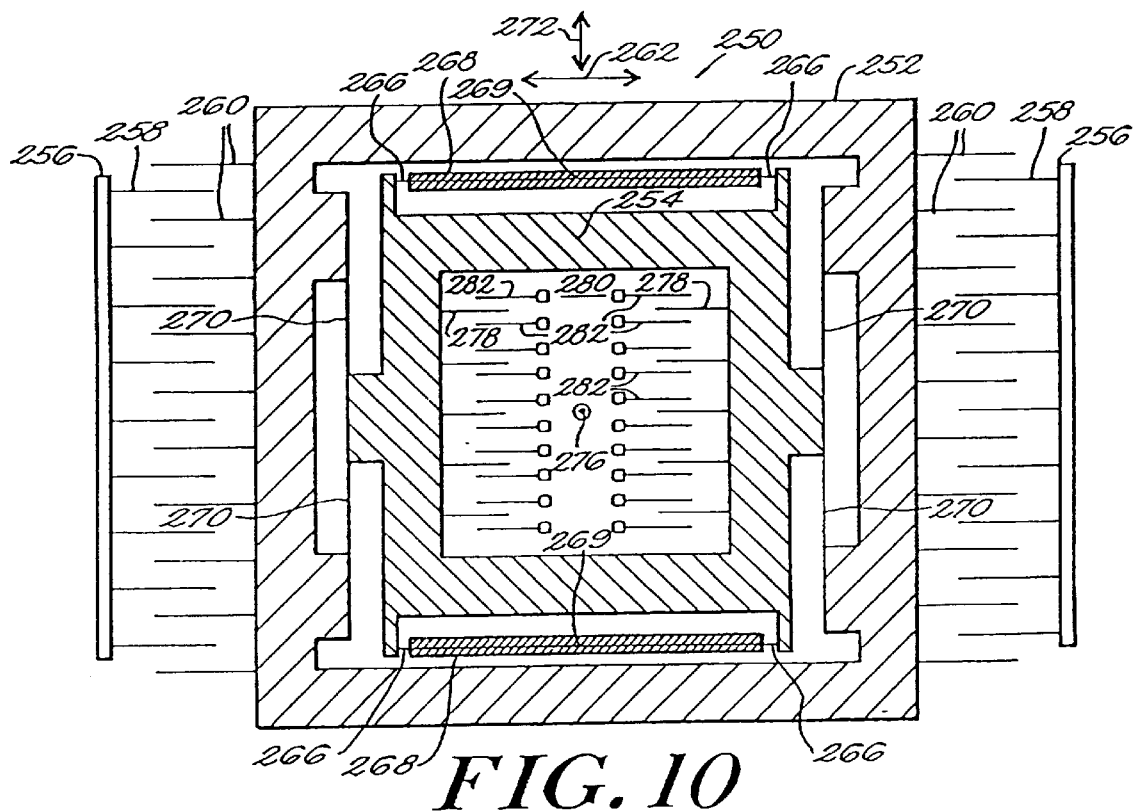
FIG. 10 is a plan view illustrating a gyro according to a fourth embodiment of the present invention.

FIG. 10 illustrates a simplified plan view of a gyro 250 according to another embodiment of the present invention. Gyro 250 has an outer frame 252 and an inner frame 254. A dither drive mechanism 256 can be positioned to apply a dithering motion to outer frame 252 through fingers 260 extending from outer frame 252 parallel to a dither axis 262. Inner frame 254 is coupled to outer frame 252 through flexures 270 oriented in parallel to a Coriolis axis 272 that is perpendicular to dither axis 262. Elongated stationary members 268 extend along dither axis 262 and are centrally anchored to the underlying substrate 264 through anchors 269. Flexures 266 extend from each end of each anchored stationary member 268 in a direction parallel to dither axis 262. Flexures 266 thus prevent outer frame 252 from moving along dither axis 262, while flexures 270 allow outer frame 252 and inner frame 254 to move together along Coriolis axis 272. As noted above, stationary members 268 control stress and tilt and help keep the flexures at their appropriate length.

In response to rotation about a sensitive axis 276 (which is mutually orthogonal to axes 262 and 272), outer frame 252 and inner frame 254 move along Coriolis axis 272. Inner frame has sensing fingers 278 extending inwardly into an aperture 280, each located between two fixed fingers 282 such that fingers 278 and fingers 282 form a differential capacitor with a number of individual cells. The voltage on inner frame 254 can be sensed to determine the change in motion, which, as noted above, indicates the rotational velocity about axis 276. As in FIG. 3, four gyros of the type shown in FIG. 10 can be connected together in a cross-quad manner. Moreover, other features discussed above, such as the stop members, positioning of anchors, and conductive members on the substrate can be employed with this embodiment of FIG. 10.

Figure 11:
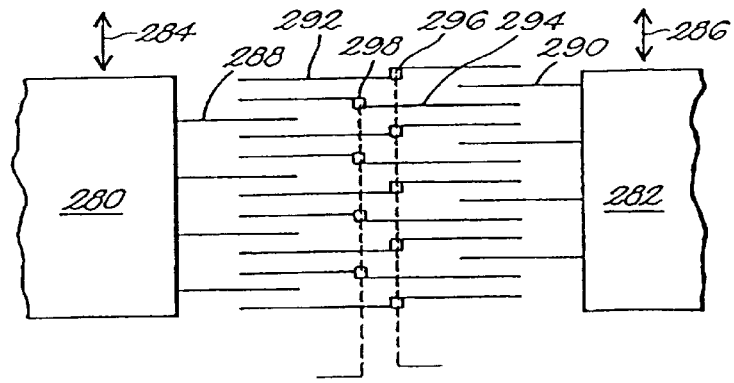
FIG. 11 is a plan view illustrating a gyro with fixed fingers serving to form one electrode on each side of two spaced rows of capacitive cells.

Referring to FIG. 11, another improvement is illustrated. In the situation in which a number of movable fingers are between two sets of fixed fingers to make up capacitive cells, one or both of the fixed fingers can be arranged to extend across two gyros or two sets of fingers to reduce space and reduce processing. As shown in simplified FIG. 11, movable masses 280 and 282 are each movable along the direction of arrows 284 and 286. Each of these masses has respective fingers 288 and 290 that move with the respective mass. Fingers 288 and 290 are between two stationary fingers, including first fingers 292 and second fingers 294. As shown here, fixed fingers 292 are formed in substantially straight lines to form one electrode of the differential capacitor with movable finger 288, and also to form one electrode of a differential capacitor with a movable finger 290. Fixed fingers 292 are formed with a dog-leg configuration so that they extend from one side of each movable finger 288 to another side of each movable finger 290 (with the sides being in reference to the direction indicated by arrows 284 and 286). With this arrangement, fewer separate fingers need to be manufactured, and fewer connections need to be made to the stationary fingers. Electrical contact points 296, 298 to fingers 292 and 294, respectively, are offset along a direction perpendicular to the direction of arrows 284 and 286 so that contacts can be made in a straight line with conductors on the surface of the substrate and anchors at the contact points to the conductors on the substrate.

The arrangement shown in FIG. 11 can be used when there are multiple adjacent gyros, such as in the situation illustrated by FIG. 3, and as the connections would be made in FIG. 4 with multiple gyros. Indeed, in FIG. 4, the connections to fixed fingers 112 and 113 are arranged in such a staggered fashion, but there is no gyro shown to the side of the gyro in FIG. 4. The arrangement of fixed fingers as shown in FIG. 11 could be used in the aperture region of the inner frame in FIG. 10. By arranging the fixed fingers in this manner, processing is reduced as the number of fingers to be formed is reduced, and also space can be made for additional cells, thereby increasing the signal that is received and improving accuracy.

Figure 12:
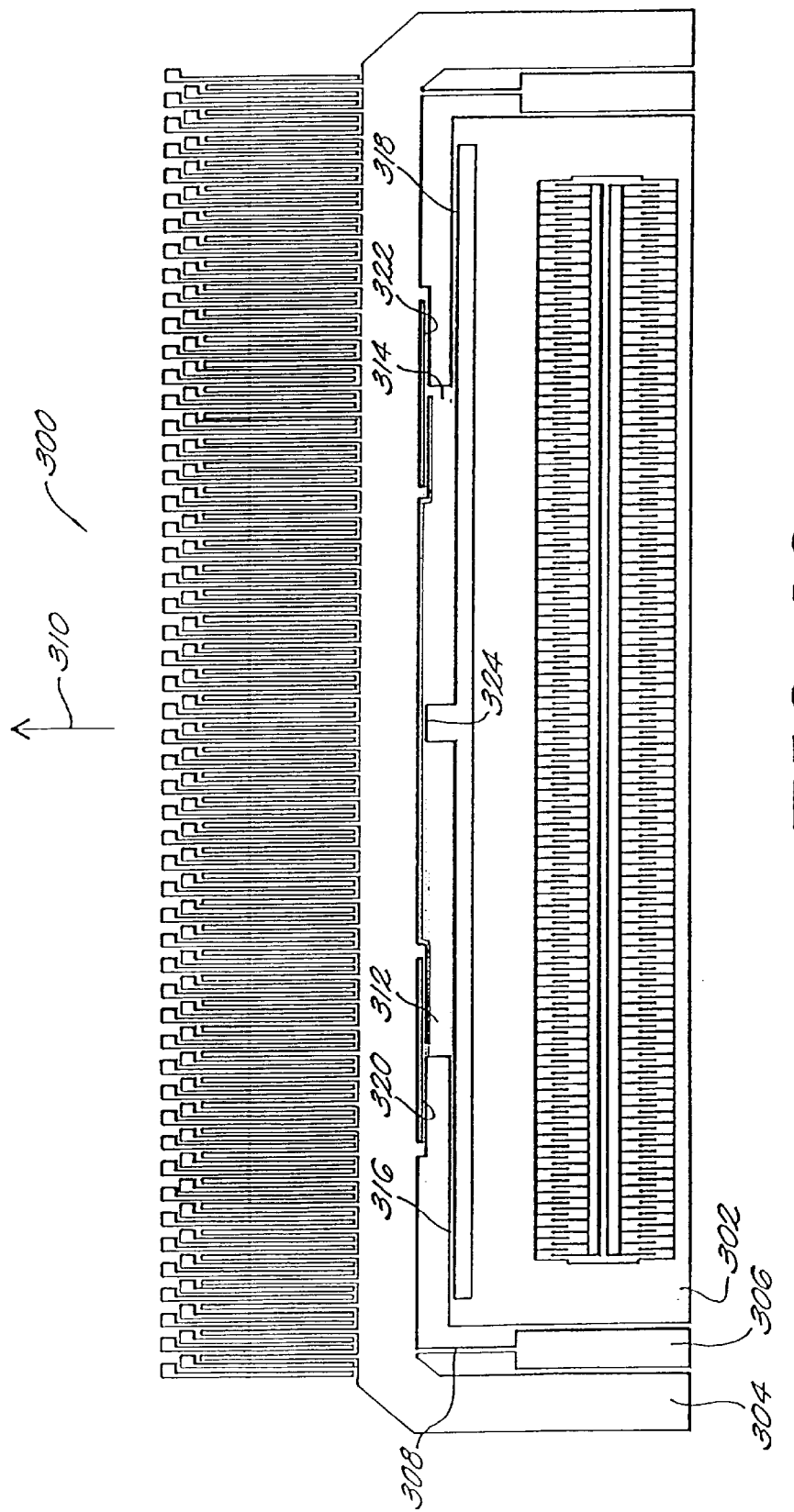
FIG. 12 is a plan view of a portion of a gyro showing a connection from an inner frame to an outer frame according to another embodiment of the present invention.

Referring to FIG. 12, in another embodiment of the present invention, a portion of a gyro 300 is shown. As shown in FIGS. 4 and 10, gyro 300 has an inner frame 302, an outer frame 304, anchored stationary beams 306 between the inner and outer frames and flexures 308 for preventing the outer frame from moving along a dither axis 310, which is parallel to the elongated direction of flexures 308. Inner frame 302 is dithered along dither axis 310 relative to outer frame 304, which is inhibited from moving along dither axis 310.

In the embodiment of FIG. 4, flexures 90 were oriented perpendicular to the dither axis for allowing movement along the dither axis. With such a structure, these flexures are under a high tensile force and have a tendency to stretch. If significant enough, such stresses could start to buckle the frame and/or could change the resonant frequency of the system.

Referring to FIG. 12, the connection between inner frame 302 and outer frame 304 is made through a connection structure that includes pivoting beams 312 and 314, that are connected to inner frame 302 through flexures 316 and 318, and to outer frame 304 with flexures 320 and 322. Pivoting beams 312 and 314 are connected together with a small cross-piece 324.

Figure 13:
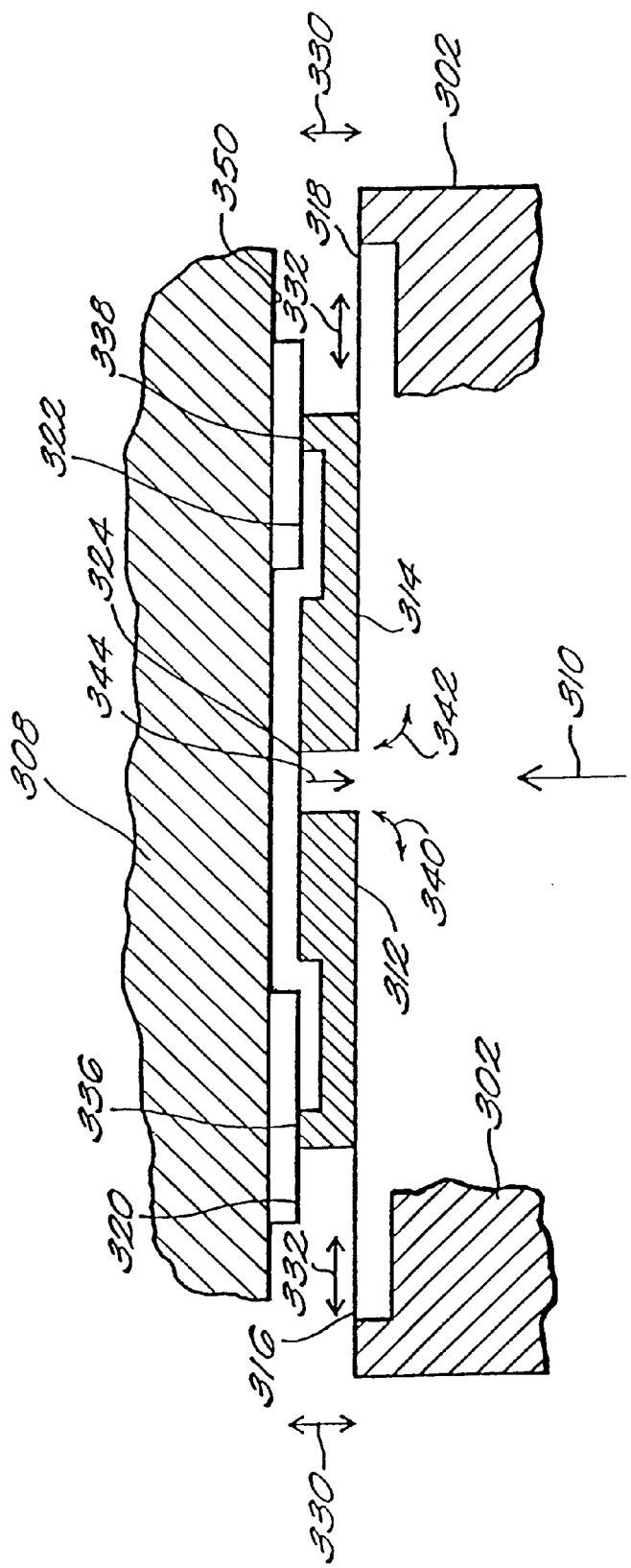
FIG. 13 is another plan view of the gyro of FIG. 12, illustrating the forces on the gyro during dithering.

Referring to FIG. 13, a close-up and simplified view of the connection structure is shown. As inner frame 302 is dithered along dither axis 310, inner frame 302 moves as indicated by arrows 330, causing perpendicular stresses along flexures 316 and 318 in the direction indicated by arrows 332. Because pivoting beams 312 and 314 are connected to flexures 320 and 322, each of which is oriented along a direction parallel to arrows 332, the intersection of beam 312 and flexure 320 and the intersection of beam 314 and flexure 322 form pivot points 336 and 338, respectively, causing beams 312 and 314 to move along the direction indicated by arrows 340 and 342, respectively. This movement of the pivoting beams causes a small movement by cross-piece 324 along the direction indicated by arrow 344, which is parallel to dither axis 310.

This structure encourages movement of beams 312 and 314 in an opposite rotational direction while discouraging simultaneous rotation in the same direction; i.e., the structure allows anti-phase movement, and substantially inhibits in-phase movement. If the pivoting beams were to try to rotate in the same direction at the same time, the cross-piece would need to lengthen and would undergo a complex twisting motion. Consequently, this structure helps to prevent such movement. The pivoting mechanism thereby prevents the unwanted motion of dither frame 302 perpendicularly to the preferred dither axis, i.e., from producing a motion which interferes with the Coriolis signals. By alleviating the tensile forces in flexures 316, 318, frame 302 can move more freely along dither axis 310 and produce a larger signal. The alleviation of these tensile forces also prevents distortions of the accelerometer frame by the dither motion, while such distortions could otherwise produce interfering signals if unchecked.

In the embodiment of FIGS. 12 and 13, outer frame 308 is shown with a linear inner edge 350 that faces the connection structure and inner frame 302. As an alternative, a portion of outer frame 308 may be recessed relative to edge 350 for connection to flexures 320 and 322. Regardless of the recess, it is desirable for cross-piece 324 to be in a line with flexures 320 and 322.

FIGS. 12 and 13 each show flexures 316 and 318 extending to a corner of beams 312 and 314, effectively forming a linear and continuous edge with beams 312 and 314. To create more space between beams 312, 314 and inner frame 302 when beams 312, 314 pivot, it can be desirable to shave off portions of the edges of beams 312 and 314 facing inner frame 302, particularly at the corner most remote from respective pivot point 336 and 338.

Referring again to FIG. 12, there is a difference in the arrangement of the apertures and fingers relative to the embodiment of FIG. 4. As shown in FIG. 4, there are three elongated apertures with fingers, and each of the apertures has some drive fingers and some pickoff fingers. FIG. 12, by contrast, shows one aperture out of five, and that aperture has only drive fingers connected together. In this embodiment of FIG. 12, there are five apertures, the middle of which is used only for pickoff fingers and not driving fingers, while the other four apertures have only driving fingers and not pickoff fingers.

Another difference with respect to the embodiment of FIG. 4 is that in the embodiment of FIG. 12, the connectors that are used to drive and pick off combs are made from polysilicon formed on the surface of the substrate, rather than diffused n+ connectors. With the polysilicon on the surface, the fingers can be made more accurately, thus allowing more fingers in the same space and therefore more force per unit area.

Figure 14:
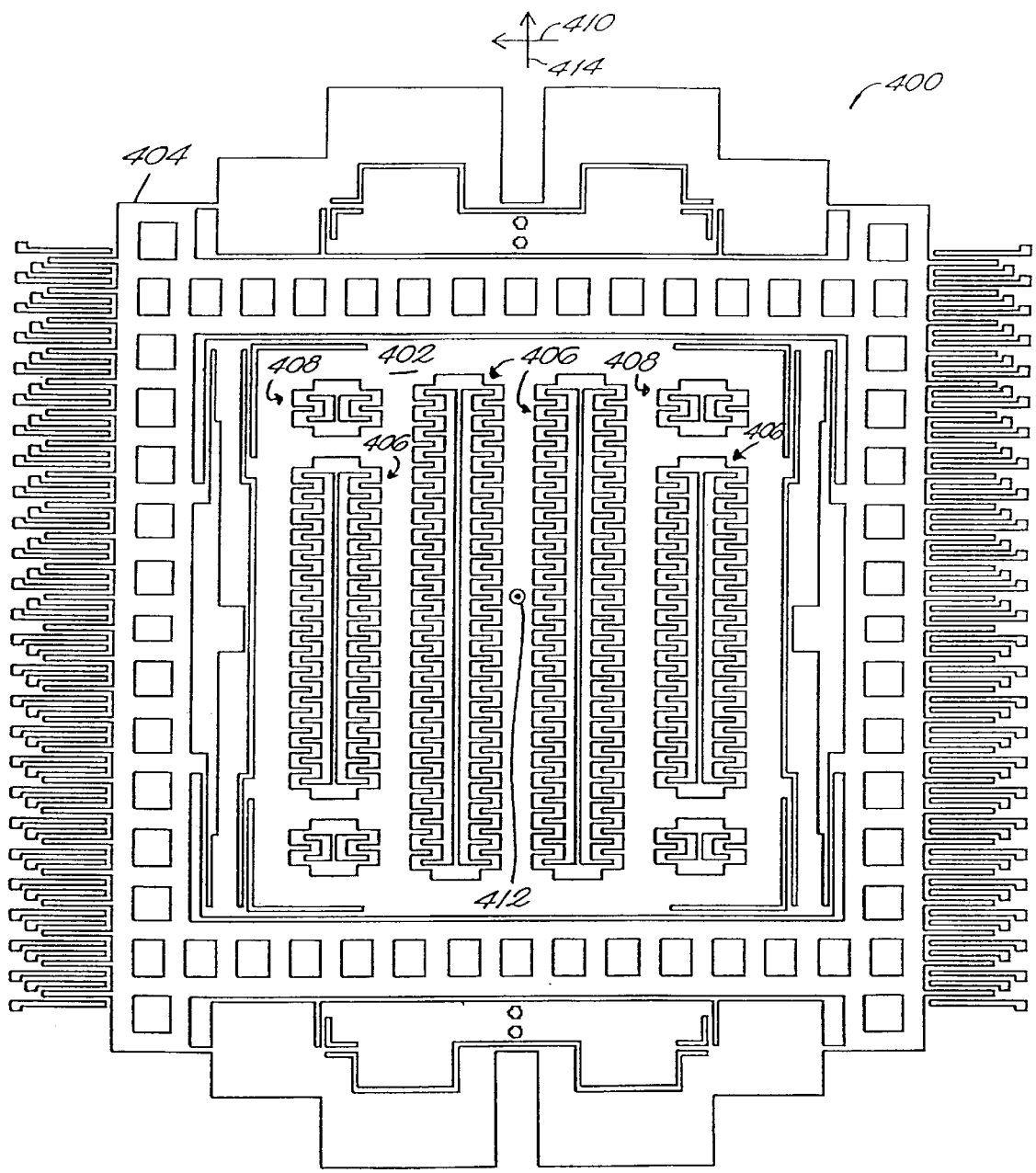
FIGS. 14 and 15 are plan views illustrating yet another embodiment of the present invention.
Figure 15:
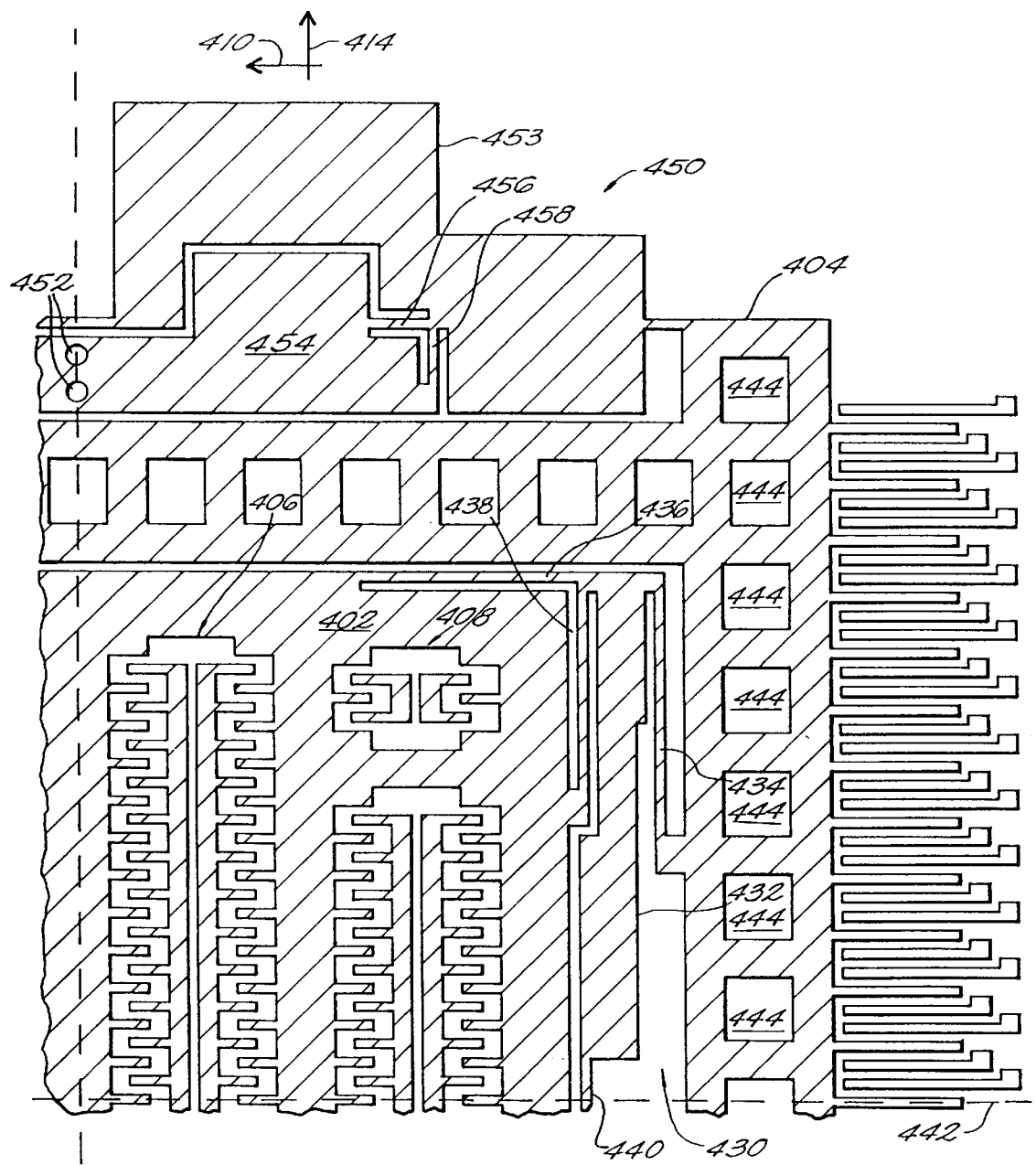

Another embodiment of the present invention is illustrated in FIGS. 14 and 15. A gyro 400 has an inner frame 402 surrounded by an outer frame 404. Inner frame 402 is dithered along a dither axis 410 through the use of a dither drive mechanism 406. As described in the embodiments above, dither drive mechanism 406 is preferably formed with combs of drive fingers that interdigitate with fingers on inner frame 402 and are driven with voltage signals to produce the sinusoidal motion. In the embodiment of FIG. 14, inner frame 402 has four elongated and parallel apertures that include the drive fingers.

In the four corners of inner frame 402 are apertures that have dither pick-off fingers for sensing the dithering motion. As discussed in embodiments above, this sensed dithering motion is fed back to the dither drive mechanism that drives inner frame 402 along dither axis 410.

In response to an angular velocity about a central sensitive axis 412, outer frame 404 is caused to move along a Coriolis axis 414. As described above, inner frame 402 can be dithered relative to outer frame 404, while inner frame 402 is coupled to outer frame 404 so that inner frame 402 and outer frame 404 move together along Coriolis axis 414. In this embodiment, the coupling between inner frame 402 and outer frame 404, and the anchoring of outer frame 404 to the substrate are designed to improve performance and to reduce the interfering quadrature signal to produce a very high performance gyro.

The couplings are shown in more detail in FIG. 15, which shows one-quarter of gyro 400. The other three quarters of the gyro are substantially identical to the portion shown. A dither flexure mechanism 430 is coupled between inner frame 402 and outer frame 404 to allow inner frame 402 to move along dither axis 410, but to prevent inner frame 402 from moving along Coriolis axis 414 relative to outer frame 404, but rather to move along Coriolis axis 414 only with outer frame 404.

FIG. 15 shows half of one dither flexure mechanism 430, which has a dither lever arm 432 connected to outer frame 404 through a dither main flexure 434, and connected to inner frame 402 through pivot flexures 436 and 438. Identical components would be on the other side of dashed line 442 connected through a small central beam 440 to lever arm 432. Similar to the embodiment of FIG. 12, central beam 440 encourages lever arm 432 and the corresponding lever arm connected on the other side of beam 440 to move in the same direction along dither axis 410. At the other end of lever arm 432, flexures 436 and 438 extend toward inner frame 402 at right angles to each other to create a pivot point near the junction of flexures 436 and 438.

This coupling and connection mechanism has a number of advantages over other structures recited herein. Because the length of the lever arm from the pivot point to the small central flexure is long relative to the total length of the inner frame, the ratio of stiffness of the mechanism for perpendicular motion of the dither mass and for relief of tension in the main dither flexure is increased. For a given residual tension, there is good resistance to perpendicular motion, or for a given resistance, the perpendicular motion creates less distortion in the accelerometer frame compared to the embodiments of FIG. 12. Flexures 436 and 438 can be made long, thereby reducing tension for a given dither displacement. The flexures 436 and 438 are connected to inner frame 402 at points nearer to the center of the inner frame in the length and width directions, the distortion for a given amount of tension is reduced relative to other embodiments. Because the two pivoting flexures are perpendicular to each other, the pivot point is better stabilized than in other structures. By moving the effective attachment point of the dither mechanism to the inner frame toward the outside of the inner frame, there is better stability in the inner frame against tilting. To keep lever arm 432 stiff compared to central beam 440, lever arm 432 is made wide; while this greater width does improve stiffness, it has the drawback in requiring additional space.

Compared to the embodiment of FIG. 12, outer frame 404 is made stiffer by increasing its width. As indicated above, however, the ratio of signals is modified by m/M, where M is the total mass of both frames, and m is the mass of the inner frame. Consequently, it is desirable to reduce the mass of the outer frame, so that M is as small as possible relative to m. Consequently, a number of holes 444 are cut out of outer frame 404. While the existence of holes 444 reduces the mass, they do not have any substantial effect on the stiffness because they create, in effect, a number of connected I-beams. This increase in stiffness and performance does come at the price of increased size of the device, however, thereby lowering yield on the wafer level.

To further improve the performance of device 400 compared to prior embodiments, outer frame 404 is coupled and anchored to the substrate through a connection mechanism 450 and a pair of anchors 452 that are connected together. Connection mechanism 450 includes plates 453 and 454 connected together with short flexures 456 and 458, which are perpendicular to each other.

The structural polysilicon used to make the masses and flexures should be somewhat tensile in comparison with the substrate so that the structures fabricated from the polysilicon have a well-defined and singular form. A consequence of this is that the accelerometer flexures are slightly bent as manufactured. If these flexures are imbalanced in terms of stiffness, a slight static tilt can be introduced into the overall structure with consequences similar to a tilt of the normal mode. The forces from the dither motion can differentially straighten the flexures, thereby providing an additional dynamic tilt around the gyro axis. Moreover, the frame bows in response to the tension in the dither flexures, thereby giving a similar effect as does differential stretching of the flexures from the reaction forces which tilt the structure in the plane of the substrate.

In the embodiment of FIG. 15, the pivot points are defined by flexures 456 and 458 so that outer frame 404 can easily move perpendicular to the dither motion by pivoting plate 453 relative to plate 454 thereby giving a single bending action to flexures 456 and 458 at the ends and in the center. To accomplish this, center beam 440 should be co-linear with the pivot points.

Having described embodiments of the present invention, it should be apparent that modifications can be made without departing from the scope of the invention as defined by the appended claims. While a cross-quad arrangement with four gyros has a number of benefits described above, with highly accurate processing, one may only use two to eliminate common mode external accelerations. In yet another alternative, a larger array with more than four gyros could be arranged and coupled together.

What is claimed is:

1. A micromachined device comprising:

a substrate;

a first body suspended over the substrate in a plane parallel to the substrate and movable in the plane and relative to the substrate;

a first plurality of fingers extending in parallel away from the first body and coplanar with the first body;

a second plurality of fingers parallel to the first plurality of fingers and interdigitating with the first plurality of fingers;

a first conductive member on the substrate under a first group of the first plurality of fingers and the second plurality of fingers, the first conductive member held at the same voltage as the second plurality of fingers; and a second conductive member on the substrate under a second group of the first plurality of fingers and the second plurality of fingers, the second conductive member held at the same DC voltage as the first plurality of fingers.

2. The device of claim 1, wherein the first and second pluralities of fingers include drive fingers for dithering the first body in a first direction.

3. The device of claim 1, wherein the first conductive member is coupled to the second plurality of fingers.

4. The device of claim 3, wherein the first plurality of fingers have a net downward force over the first conductive members and the second plurality of fingers have a net upward force over the second conductive members, the forces canceling to keep the first body in the plane.

5. The device of claim 1, wherein the first body is movable in the plane along a dither axis, the device further comprising a second body suspended over the substrate, the first and second bodies being coplanar in a first plane parallel to the substrate, the second body coupled to the first body such that the second body is substantially inhibited from moving relative to the substrate along the dither axis.

6. The device of claim 5, wherein the first body surrounds the second body.

7. The device of claim 5, wherein the second body surrounds the first body.

8. The device of claim 5, wherein the second body is movable in the plane in a sensing direction perpendicular to the dither axis, the second body having fingers, the device further comprising stationary fingers that form a differential capacitor in the plane to sense movement in the sensing direction.

9. The device of claim 1, wherein the first body has a perimeter portion defining and surrounding an aperture.

10. The device of claim 9, wherein the first plurality of fingers extends inwardly from the first body into the aperture.

11. The device of claim 9, wherein the first body has at least one cross-piece extending from one part of the perimeter portion to another part of the perimeter portion to define a plurality of apertures.

12. The device of claim 11, wherein the first plurality of fingers extends inwardly from the cross-piece into at least two apertures.

13. The device of claim 1, further comprising a package, wherein the device is packaged under ambient conditions.

14. A micromachined device comprising:

a substrate;

a first body over the substrate;

a second body suspended over the substrate in a plane parallel to the substrate and movable in the plane and relative to the substrate and to the first body;

a first conductive member on the substrate under a portion of the first and second body and held at a voltage; and a second conductive member formed on the substrate under a second portion of the first and second body and electrically coupled to the first body.

15. The device of claim 14, further comprising a third conductive member on the substrate and under a third portion of the first and second body and held at the voltage.

16. The device of claim 15, further comprising a fourth conductive member on the substrate and under a fourth portion of the first and second body and electrically coupled to the second body.

17. The device of claim 16, wherein the first, second, third, and fourth conductive members are arranged in a row, with each spaced from the other.

18. A micromachined device comprising:

a substrate;

a first body suspended over the substrate and movable relative to the substrate;

a first plurality of fingers extending away from the first body;

a second plurality of fingers interdigitating with the first plurality of fingers;

a first conductive layer on the substrate under the first plurality of fingers and the second plurality of fingers, the first conductive layer held at the same voltage as the second plurality of fingers; and a second conductive layer on the substrate under the first plurality of fingers and the second plurality of fingers, the second conductive layer held at the same voltage as the first plurality of fingers.

19. The device of claim 18, further comprising a third conductive layer spaced from the first conductive layer and held at the same voltage as the second plurality of fingers, and a fourth conductive layer spaced from the second conductive layer and held at the same voltage as the first plurality of fingers.

20. The device of claim 19, wherein the first through fourth conductive layers are arranged in a line under the fingers in the order of first, second, third and fourth layers.

* * * * *